(12) United States Patent
Noé

(10) Patent No.: US 8,132,475 B2
(45) Date of Patent: Mar. 13, 2012

(54) METHOD OF AND APPARATUS FOR MEASURING STRIP PLANARITY

(75) Inventor: Andreas Noé, Duisburg (DE)

(73) Assignee: BWG Bergwerk-und Walzwerk-Maschinenbau GmbH, Duisburg (DE)

(*) Notice: Subject to any disclaimer, the term of this patent is extended or adjusted under 35 U.S.C. 154(b) by 270 days.

(21) Appl. No.: 12/493,273

(22) Filed: Jun. 29, 2009

(65) Prior Publication Data

US 2009/0320616 A1   Dec. 31, 2009

(30) Foreign Application Priority Data

Jun. 30, 2008  (DE) .......................... 10 2008 030 282

(51) Int. Cl.
*G01L 1/04*   (2006.01)
(52) U.S. Cl. ................................. 73/862.453
(58) Field of Classification Search .............. 73/862.453
See application file for complete search history.

(56) References Cited

U.S. PATENT DOCUMENTS

| | | | | |
|---|---|---|---|---|
| 4,127,027 A * | 11/1978 | Berger et al. | ............... | 73/862.07 |
| 6,606,919 B2 * | 8/2003 | Perenon et al. | ........... | 73/862.453 |
| 6,668,626 B2 * | 12/2003 | Grefve et al. | ................... | 73/104 |
| 6,853,927 B2 * | 2/2005 | Noe et al. | ........................ | 702/41 |
| 7,143,657 B2 | 12/2006 | Noe | ......................... | 73/862.453 |
| 7,357,022 B2 | 4/2008 | Noe | ............................... | 73/159 |

FOREIGN PATENT DOCUMENTS

| DE | 10329430 | 2/2005 |
|---|---|---|
| DE | 102004008303 | 2/2005 |

* cited by examiner

*Primary Examiner* — Lisa Caputo
*Assistant Examiner* — Octavia Davis-Hollington
(74) *Attorney, Agent, or Firm* — Andrew Wilford (57) ABSTRACT

A tensioned metal strip over an apparatus for measuring tension that only has a roller rotatable about an axis transverse to the direction and having a substantially cylindrical outer surface engaged generally tangentially by the strip, a radially shiftable tension-measuring bar set in the roller, extending generally only angularly of the axis so as to lie in a plane substantially perpendicular to the axis, and having an outer surface generally flush with the roller surface. Sensors between the bar and the roller for measuring radial deflection of the bar. The apparatus, when used to determine planarity, further has a planarity-measuring bar also set in the roller, extending at an acute angle to and across a respective plane perpendicular to the axis, and having an outer surface generally flush with the roller outer surface. Other sensors between the planarity-measuring and the roller measure radial deflection of the planarity-measuring bar.

10 Claims, 6 Drawing Sheets

METHOD OF AND APPARATUS FOR MEASURING STRIP PLANARITY

FIELD OF THE INVENTION

The present invention relates to detecting defects in strip planarity or tension. More particularly this invention concerns an apparatus and method using a roller for monitoring strip planarity and tension in a steel-rolling mill.

BACKGROUND OF THE INVENTION

A typical such apparatus uses a roller in which is seated at least one rocker-type measuring bar or beam generally flush with the cylindrical outer surface of the roller and supported on sensors, for example force measurers, preferably piezo elements. Such a roller can be used for determining if there are defects in the planarity of a strip, or for determining the planarity of a metal strip when the planarity-measuring bar integrated into the roller jacket or the roller surface is supported on one or more and extends obliquely with respect to the roller axis so that the measuring bar on the one hand extends axially over a specified transverse width region and on the other hand extends angularly over a specified angular extent of the roller. In such a planarity-measuring roller, a plurality of planarity-measuring bars may be distributed transversely of the longitudinal strip-travel direction, across the transverse width of the strip. Each such bar covers a respective transverse region of the measurement roller or the metal strip and optionally extends over an identical angular extent. Each planarity-measuring bar is preferably supported on two sensors set at the ends of the respective the bar for example. The sensors are preferably designed as force transducers, for example strain gaugs. However, the invention also encompasses embodiments using other sensors.

By use of such a planarity-measuring roller, defects in the planarity of strips, in particular metal strips, are determined by measuring the distribution of strip tension across the transverse width of the strip, the strip under tension over the entire strip width wrapping around the planarity-measuring roller at a specified wrap angle, thereby exerting localized pressure forces on the planarity-measuring roller corresponding to the local longitudinal tension distribution in the transverse strip width direction, from which the distribution of strip tension may be determined. The distribution of strip tension across the width of the strip thus indicates the locations of strip defects and in particular waves or strip sabers, since longitudinal deviations in individual flat strips are reflected in differences in tension.

A planarity-measuring roller of the above-described type is known from commonly owned U.S. Pat. No. 7,357,022. In this planarity-measuring roller, two measuring bars are integrated diametrically opposite each other into the roller and are connected together by a diametral tension rod. Each of the measuring bars is supported on force transducers. By using such a system, in particular piezoquartz elements under pretension may be operated as sensors without having to take force shunts into account, since pretension, centrifugal forces, and gravity forces from the measuring bar may be compensated for by the diametrically opposed configuration.

Although the known planarity-measuring rollers are well known, they are still amenable to refinement. Thus, there is the basic problem that the measuring bar is used to measure the tension at a given strip width coordinate which results from superimposition of the strip internal stress and the strip tension. This is because the strips are always led over the planarity-measuring roller at a specified strip tension. Lateral fluctuations in the strip tension may then lead to skewing of the measurement results. In principle it is possible to record the strip tension as a function of time, using a separate device, in order to generate a corrective factor. However, this entails a high level of complexity. If the strip tension is measured using, for example, conventional load cells in the region of the roller bearings, in many cases the dynamics are not adequate.

In addition, a roller is known having two strip-shaped pressure sensors on the outer surface of the roller, the pressure sensors being mounted in a central region of the roller and extending essentially angularly around the roller. The pressure sensors include an inorganic material having piezoelectric properties. Such a roller is a component of a printer, in which two rollers border a pressure gap (see DE 103 29 430 A1). Such developments have had no effect on the development of measurement rollers for determining the strip tension, and in particular of measurement rollers for determining defects in the planarity of a strip, in particular a metal strip.

OBJECTS OF THE INVENTION

It is therefore an object of the present invention to provide an improved measurement roller by means of which the variation in the strip tension over time may be measured in a simple and accurate manner.

Another object is the provision of an improved tension- and planarity-monitoring apparatus and method that overcome the above-given disadvantages, in particular that has high measurement accuracy and in which fluctuations in the strip tension over time do not adversely affect the planarity measurement results.

SUMMARY OF THE INVENTION

In a strip-treating system a tensioned metal strip moves in a longitudinal direction. An apparatus according to the invention for measuring tension only has according to the invention a roller rotatable about an axis transverse to the direction and having a substantially cylindrical outer surface engaged generally tangentially by the strip, a radially shiftable tension-measuring bar set in the roller, extending generally only angularly of the axis so as to lie in a plane substantially perpendicular to the axis, and having an outer surface generally flush with the roller surface. One or more sensors between the bar and the roller for measuring radial deflection of the bar. The tension-measuring bar extends angularly all around the roller. It can be made up of a plurality of bar sections.

The apparatus, when used to determine planarity, further has according to the invention a planarity-measuring bar also set in the roller, extending at an acute angle to and across a respective plane perpendicular to the axis, and having an outer surface generally flush with the roller outer surface, and sensor means between the planarity-measuring and the roller for measuring radial deflection of the planarity-measuring bar.

The invention is based on the discovery that fluctuations in the strip tension over time, which are superimposed on the measurement signals of the planarity-measuring bar, may be eliminated or compensated out in a simple and particularly precise manner when the planarity-measuring roller is not only provided with one or more planarity-measuring bars oriented obliquely with respect to the roller axis, but also has at least one reference- or tension-measuring bar as described above that extends exclusively angularly and is therefore situated not obliquely with respect to the roller axis, but instead is essentially perpendicular to the roller axis, i.e.

aligned to the strip feed direction. Because this reference/tension measuring bar is thus situated only at a single strip width coordinate, its output signal does not depend on differences in internal stress over the width of the strip, but instead depends only on the overall strip tension or its variation over time.

The reference-measuring bar thus records fluctuations in the strip tension over time. Since these fluctuations in the strip tension over time are superimposed on the output signal of the planarity-measuring bar, in this manner the influence of the temporal variations in tension in the strip may be filtered from the measurement signal of the planarity-measuring bar. Within the scope of the invention this is achieved in a particularly precise manner, since the reference signal which represents the strip tension is recorded at exactly the same time as the actual planarity measurement signal. This ensures particularly high measurement accuracy.

In one particularly preferred refinement, the invention provides that the reference-measuring bar extends essentially over the same angular extent as the planarity-measuring bar or bars. Taking into consideration the fact that the planarity-measuring bars forms an acute angle (>0° and <90°) with a plane perpendicular to the roller axis, the reference bar is consequently shorter than the planarity-measuring bar by a specified amount, so that the planarity-measuring bars on the one hand and the reference-measuring bar on the other hand extend over the same angular extent. As a result, the planarity measurement signal, i.e. the tension signal, as well as the reference measurement signal may be recorded synchronously, and for each continuous planarity measurement curve a corresponding reference measurement curve always exists covering the same time range, thus allowing any fluctuations in strip tension to be precisely filtered out.

According to a further provision, the planarity-measuring bar is situated in approximately the center of the roller, that is axially of the roller and transverse to the strip. It is then practical to provide at least one planarity-measuring bar or a plurality of planarity-measuring bars on each side of the reference-measuring bar.

Within the scope of the invention, it is advantageous that the planarity-measuring bars are able to extend over a relatively large angular extent, and therefore also over a relatively large angular extent, of the roller. This angular extent or angular extent of the planarity-measuring bars has heretofore been kept relatively small in the known deflection measurement rollers, since the problem of fluctuations in strip tension over time is exacerbated as the angular extent increases. As a result of the compensation according to the invention for fluctuations in strip tension over time, within the scope of the invention it is now possible to operate using planarity-measuring bars which extend over a relatively large angular extent. In practice, this design may be implemented in a particularly advantageous manner by forming a planarity-measuring bar from a plurality of directly adjacent bar sections in flush alignment which, for example, are supported on force transducers situated on the end. In principle, it is thus possible to provide a "single" measuring bar which is composed of a plurality of partial measuring bars and which extends in a spiral or helical fashion over the outer surface and over the entire strip width. In such a case it is practical to provide in a region of the roller at least one reference-measuring bar which likewise extends over the same angular extent, so that there is always proper compensation for the fluctuations in strip tension.

The subject matter of the invention also concerns a method for determining defects in the planarity of a strip, i.e. for determining the strip planarity, in particular of a metal strip, using a planarity-measuring roller of the described type, wherein the planarity-measuring bar is used to measure a tension signal as a function of time, which represents the width coordinate, and wherein the reference-measuring bar is used to measure as a function of time a reference signal which is independent of the width coordinate and which represents the variation in strip tension over time, and wherein the reference signal is filtered from the tension signal for determining the internal stress variation. This is achieved, for example, by determining the internal stress, and consequently the internal stress signal which represents strip defects, as a function of the width coordinate by determining the difference between the tension signal and the reference signal.

The above discussion clearly shows that a strip tension measuring bar according to the invention is particularly preferably used as a reference-measuring bar in combination with an oblique planarity-measuring bar in a planarity-measuring roller. The primary function of such a planarity-measuring roller is the determination of planarity measurement errors by measuring the distribution of strip tension across the width of the strip, wherein the strip tension measuring bar performs the function of a reference-measuring bar, thus allowing fluctuations in the strip tension over time to be filtered from the measurement signal. According to a further aspect, however, the invention also encompasses embodiments of a measurement roller which operate not as a planarity-measuring roller, but, rather, as a strip-tension measurement roller, and which are used "only" for determining the variation in the strip tension of a strip over time, in particular a metal strip. In such an embodiment no planarity-measuring bars extending obliquely with respect to the roller axis are provided, but instead, only one or more strip tension measuring bars are provided which for a given width coordinate extend solely angularly and consequently are situated not obliquely with respect to the roller axis, but, rather, essentially perpendicular to the roller axis, i.e. along the strip feed direction. Such a strip tension measuring bar thus corresponds to the previously described reference-measuring bars with respect to design and function, but without planarity-measuring bars being additionally provided. By using such a strip tension measurement roller with a strip tension measuring bar, it is thus possible to measure the variation over time of the strip tension of a strip, in particular a metal strip, led over the measurement roller in a way that is simple and at the same time very precise. The measurement roller is characterized by high measurement accuracy and in particular a high dynamic level.

The invention also encompasses embodiments of a planarity-measuring roller in which a strip tension measuring bar or reference-measuring bar of the described type is combined with planarity measuring elements of another type, for example planarity measuring elements which are designed not as measuring bars, but which, for example, operate as individual measuring sites which are distributed over the roller width and/or roller outer surface.

BRIEF DESCRIPTION OF THE DRAWING

The above and other objects, features, and advantages will become more readily apparent from the following description, reference being made to the accompanying drawing in which.

SPECIFIC DESCRIPTION

As seen in FIGS. 1 through 5 a planarity-measuring roller 1 determines defects in the planarity of a metal strip 2 or determines the strip planarity of the strip 2. Such a planarity-measuring roller 1 may be integrated into a strip-treatment or strip-processing line, or a train of a rolling mill. The planarity-measuring roller 1 may, for example, be provided upstream and/or downstream from a rolling mill, skin-pass rolling mill, or straightening device and is basically cylindrical and rotatable about a center axis A perpendicular to a longitudinal strip-travel direction D. The strip 2 is under a specified longitudinal tension over its entire transverse width B and wraps around the planarity-measuring roller 1 at a specified wrap angle δ of, for example, 2° to 10°, preferably 2° to 5°.

The determination of the strip planarity, i.e. the determination of planarity defects, is indirectly carried out using the planarity-measuring roller according to the invention by measuring the distribution of strip tension across the transverse width of the strip B. To this end, the planarity-measuring roller has a plurality of planarity-measuring bars 3a and 3b integrated into the roller jacket or the roller surface, each planarity-measuring bar 3a and 3b in the illustrated embodiment being supported on two sensors 4, which in the illustrated embodiment are designed as force transducers. The sensors may be piezoquartz elements.

Figure 1:
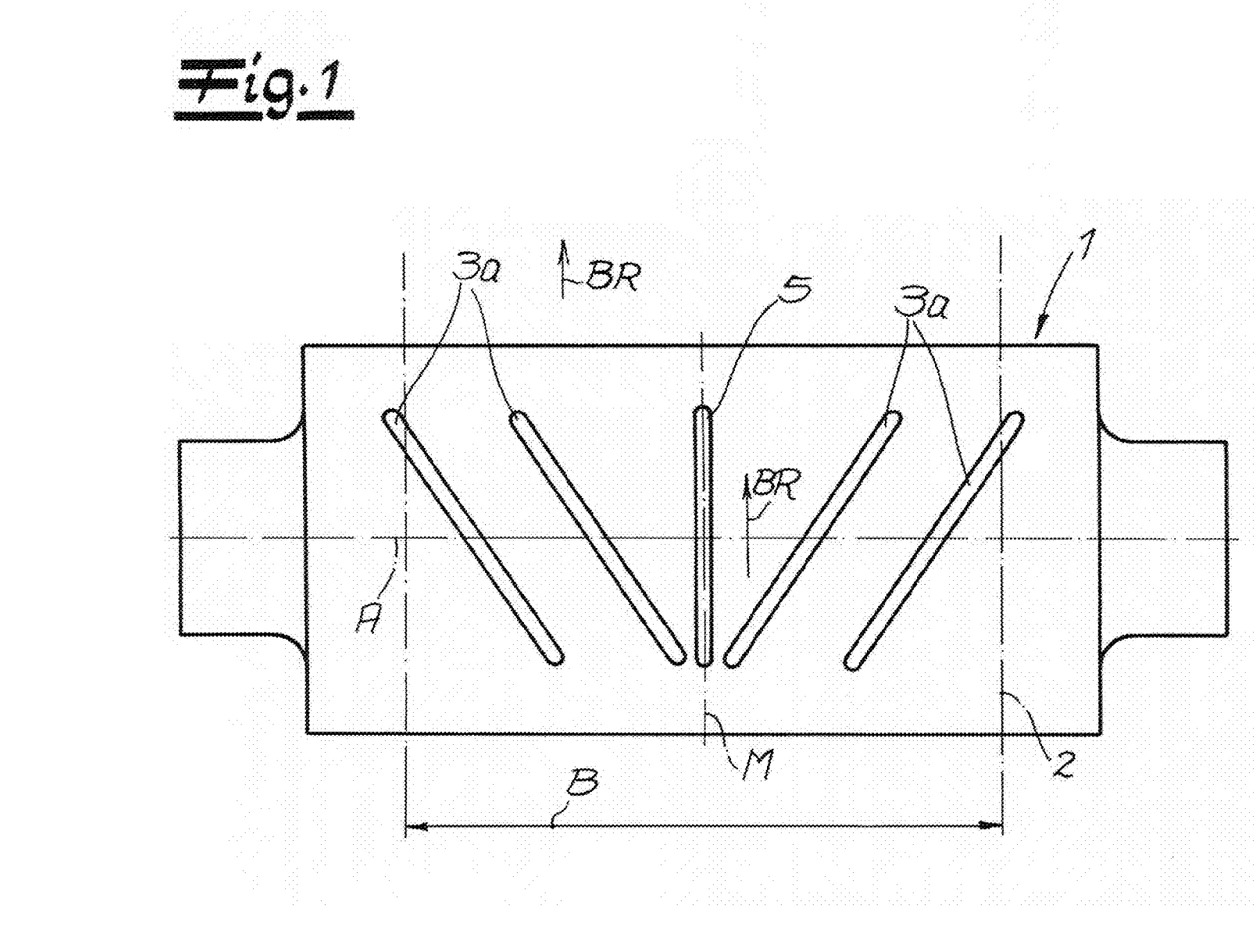
FIG. 1 is a top view of a planarity-measuring roller in a first embodiment.
Figure 2:
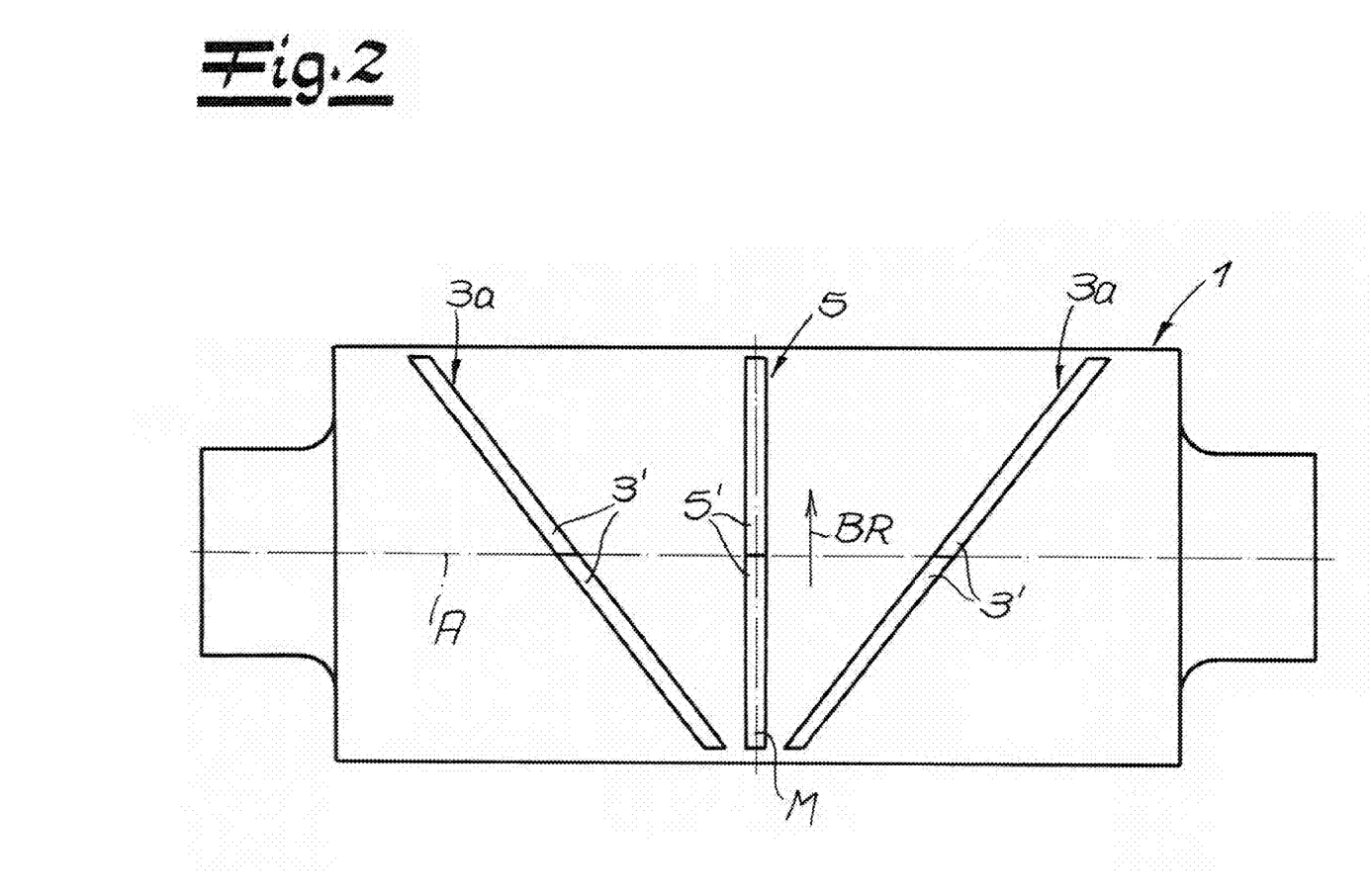
FIG. 2 is a similar view of another such roller.

FIGS. 1 and 2 further show that the planarity-measuring bars 3a and 3b are oriented obliquely or at acute angles with respect to the roller axis A, so that the planarity-measuring bars on the one hand extend parallel to the axis A an transverse to the direction B over a specified width region b (FIG. 5a) and on the other hand extend angularly over a specified angular region U1, the region U1 corresponds to the angle α. During operation, the strip 2 wraps around the planarity-measuring roller 1 by the wrap angle δ, thereby exerting localized pressure forces on the planarity-measuring bars 3a and 3b, these localized pressure forces being a function of the strip width coordinate. As the planarity-measuring roller 1 rotates, due to the oblique position of the planarity-measuring bar 3a or 3b the strip width coordinate constantly changes, so that a planarity-measuring bar 3a or 3b continuously measures the distribution of strip tension over a given strip width region, that is across a respective longitudinally extending band of the strip.

In practice, the tension distribution, which is influenced by the strip planarity and measured during a given time period, is superimposed on any fluctuations in tension over time, since the measurement is carried out for different strip width coordinates at different times. To eliminate or compensate for any fluctuations in strip tension over time which may occur, in addition to the known planarity-measuring bars 3a and 3b, the planarity-measuring roller 1 according to the invention has at least one reference-measuring bar 5. This reference-measuring bar, illustrated in FIGS. 1 and 2, is not oriented obliquely with respect to the roller axis A as are the planarity-measuring bars 3a and 3b, but instead extends essentially angularly and (in the top view) perpendicular to the roller axis A, i.e. in the strip feed direction BR or in a plane M (FIG. 1) perpendicular to the axis A. The reference-measuring bar 5 is thus situated at a (single) strip width coordinate, so that it generates a reference signal independent of internal stress fluctuations across the width of the strip but is dependent on fluctuations in the strip tension over time. To this end the reference-measuring bar 5 is also supported on sensors, for example force transducers, like for the planarity-measuring bars 3a and 3b.

Figure 4:
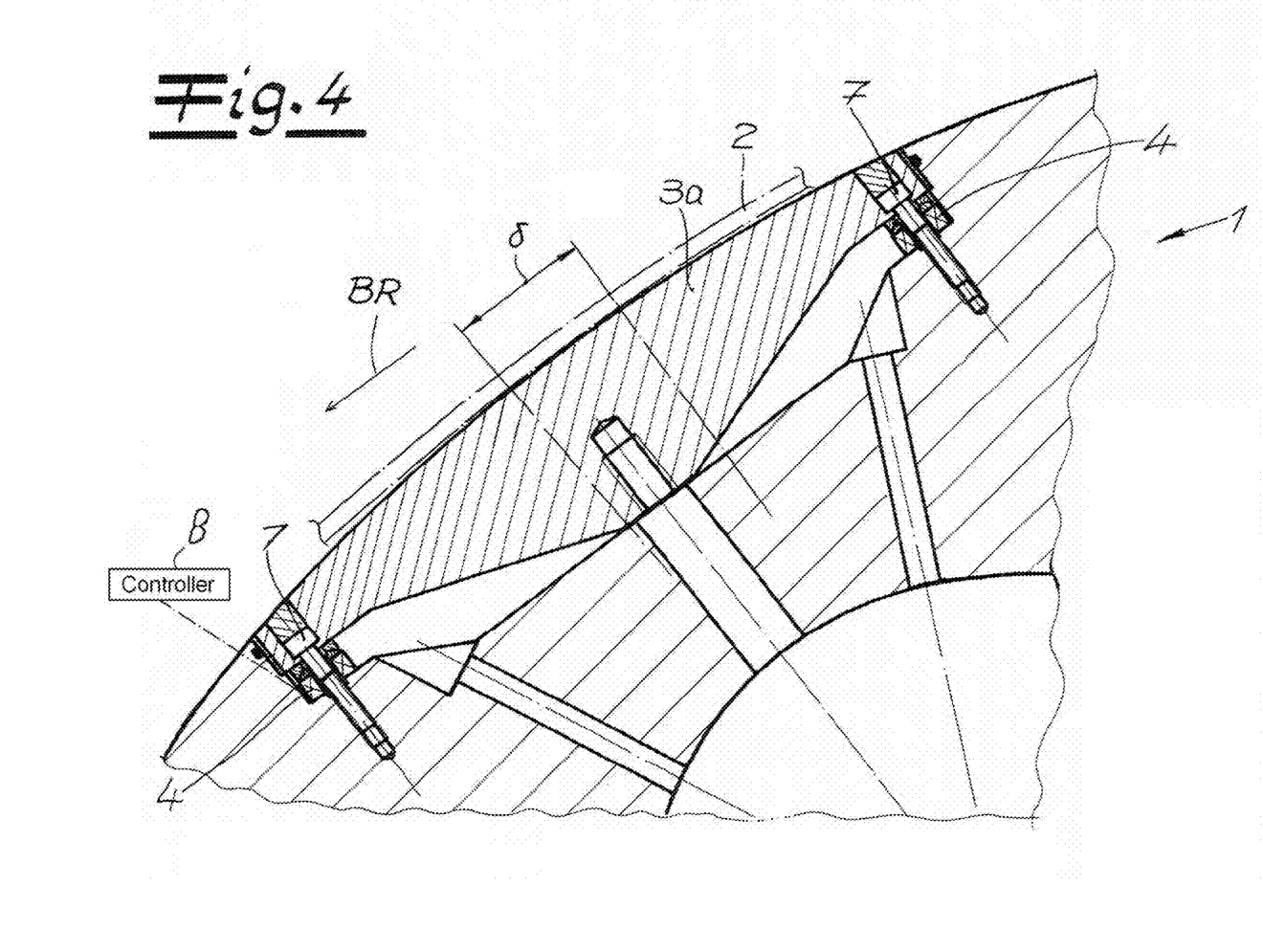
FIG. 4 is a large-scale view corresponding to a detail of FIG. 3 of a modified monitoring system.
Figure 5A:
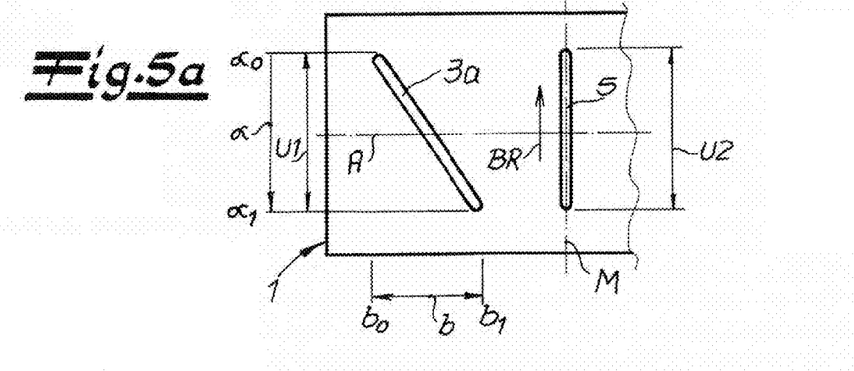
FIG. 5a is a schematic diagram illustrating the method of this invention.

FIGS. 1, 2, and 5a show that the reference-measuring bar 5 extends over an angular extent U2 that essentially corresponds to the angular extent U1 over which the planarity-measuring bar 3a and 3b extends. The reference-measuring bar 5 on the one hand and the planarity-measuring bars 3a and 3b on the other hand thus extend over the same angular extent U1=U2, and consequently over the same angle range α, so that at exactly the same time a (width-dependent) planarity measurement signal S is recorded by the planarity-measuring bars 3a and 3b, and the (width-independent) reference signal R is recorded by the reference-measuring bar 5. The desired compensation may then be carried out by a computer type control means or controller 8 (FIG. 4) filtering out or subtracting the reference signal R, which represents any fluctuations in tension over time, from the planarity measurement signal S. In this regard reference is also made to FIGS. 5a through 5e.

First, FIG. 5a once again schematically shows a detail of a planarity-measuring roller 1, together with an oblique planarity-measuring bar 3a and a respective reference-measuring bar 5. The planarity-measuring bar 3a extends over an angular extent U1, and thus over angular extent $\alpha_0$ to $\alpha_1$, and over a width region $b_0$ to $b_1$. The reference-measuring bar 5 is situated at a fixed width coordinate and extends over the same angular extent U2=U1, and thus likewise over the angular extent $\alpha_0$ to $\alpha_1$. During rotation the roller 1 passes through angular extent $\alpha_0$ to $\alpha_1$ in a time range from $t_0$ to $t_1$.

Figure 5B:
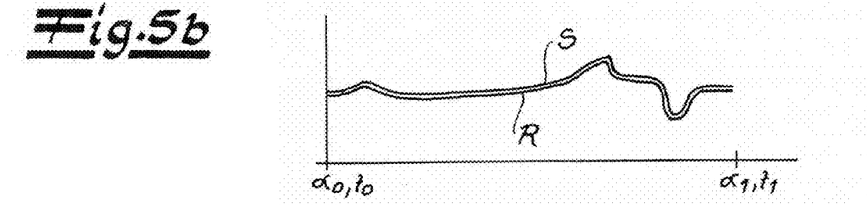
FIGS. 5b, 5c, 5d, and 5e are diagrams illustrating the instant invention.
Figure 5C:
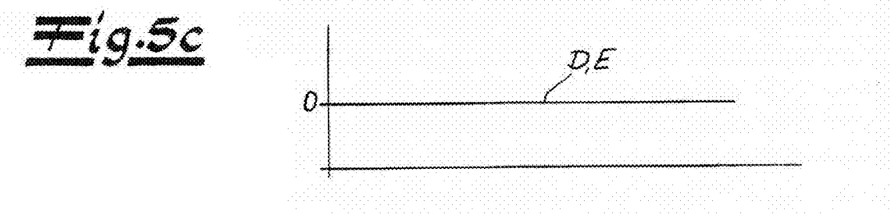

FIG. 5b shows by way of example the strip tension signal S generated by the planarity-measuring bar 3a, and also the reference signal R generated by the reference-measuring bar 5, for a first example of an ideal planar strip, but with temporal fluctuations in the strip tension during the measurement. These fluctuations in the strip tension are reflected on the one hand in the strip tension signal S and on the other hand in the reference signal R. Taking the difference of the two signals results in an internal stress signal E, illustrated in FIG. 5c, which in this example is constant; i.e. the internal stresses do not vary over the specified strip width region, and therefore no strip defects are present.

Figure 5D:
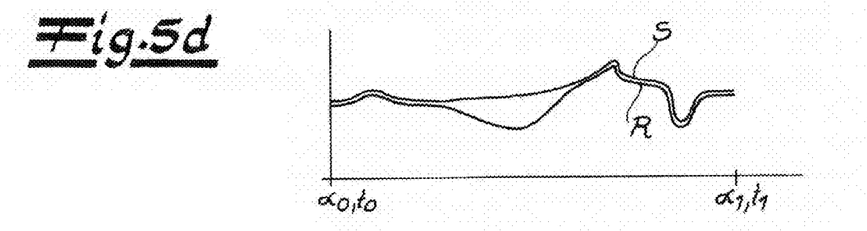
Figure 5E:
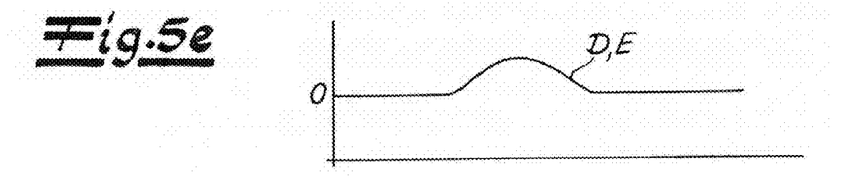

In contrast, FIGS. 5d and 5e show a second example for a nonideal planar strip, wherein once again fluctuations in the strip tension over time occur during the measurement. FIG. 5d shows the strip tension signal S measured by the planarity-measuring bar and the reference signal R measured by the reference bar. FIG. 5e shows the difference signal D=S−R which represents the internal stress E, which in this example varies across the width of the strip.

Thus, it is clear that by use of the reference-measuring bars and appropriate compensation it is possible to precisely determine the strip planarity without the measurement being skewed by fluctuations in tension over time.

In the illustrated embodiment, a reference-measuring bar 5 is situated approximately in the roller center M. One or more planarity-measuring bars 3a and 3b are situated on either side of this reference-measuring bar 5. In the embodiment according to FIG. 1, two planarity-measuring bars 3a oriented obliquely with respect to the roller axis A are situated on either side of the reference-measuring bar 5. In contrast, FIG. 2 shows an embodiment in which only one planarity-measuring bar 3a is situated on either side of the reference bar 5. These planarity-measuring bars 3a and also the reference-measuring bar 5 according to FIG. 2 extend over a larger angular extent, and thus a larger angular extent, of the roller than do the bars according to FIG. 1. For design reasons, in this embodiment according to FIG. 2 it may be practical for each measuring bar 3a and 3b and also for each reference bar 5 to be composed of a plurality of bar sections 3' or 5', respectively, whereby in forming the bar, the bar sections in successive flush alignment are directly adjacent to one another. Each bar section 3' or 5' itself may in turn be supported on a plurality of force transducers, for example two force transducers situated on the end. Details are not illustrated in FIG. 2.

Figure 3:
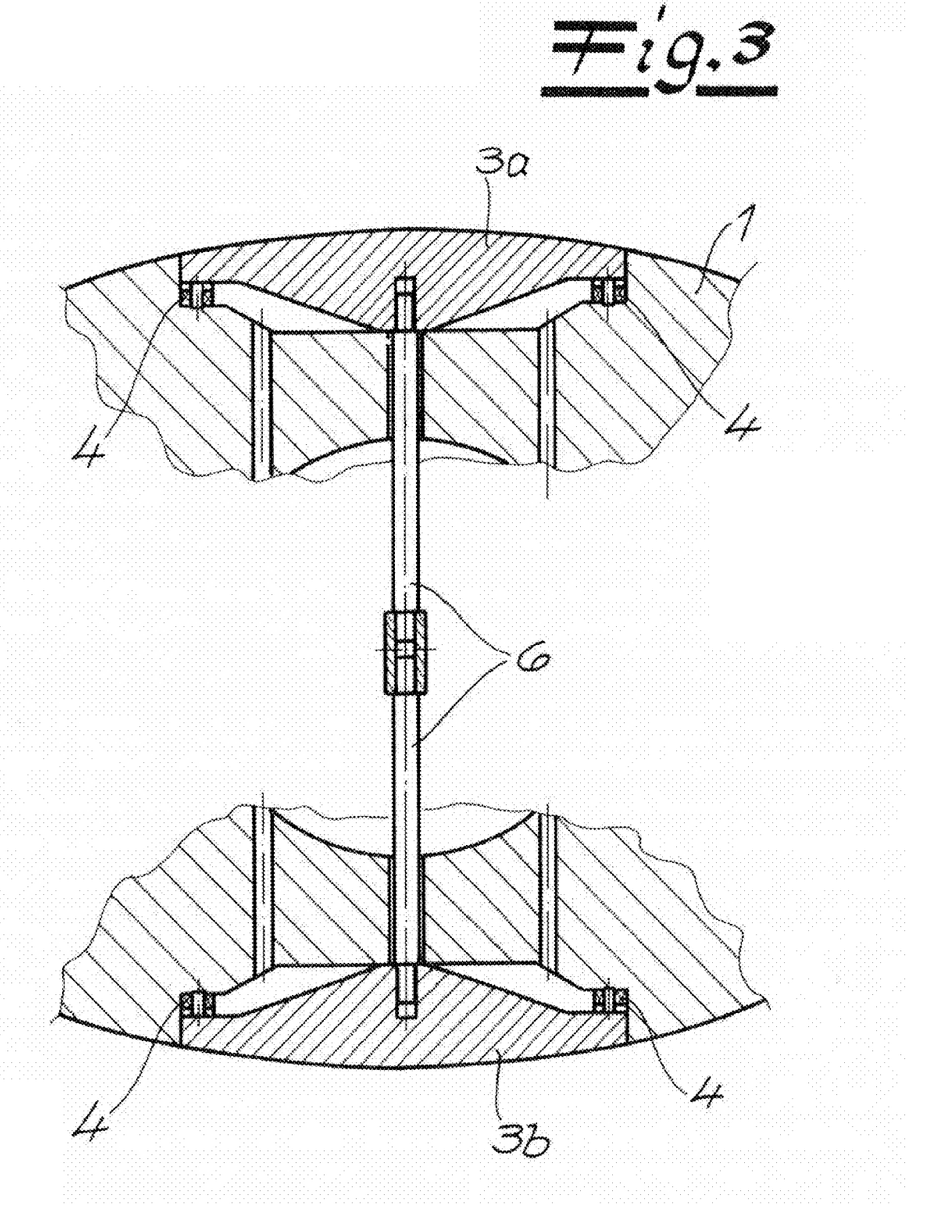
FIG. 3 is a cross-section through the roller of FIG. 1.

Lastly, FIGS. 3 and 4 show possible alternatives in the design of the deflecting measurement roller, and in particular the design of the planarity-measuring bars. Known designs may be used, as described, for example, in above-cited U.S. Pat. Nos. 7,143,657 and 7,357,022, whose disclosures are herewith incorporated by reference.

FIG. 3 shows one preferred embodiment in which two planarity-measuring bars 3a and 3b are integrated into the roller jacket in a diametrically opposed manner and fixed together opposite one another via a central tension rod 6. Each of the planarity-measuring bars 3a and 3b is supported on two force transducers 4. The force transducers are pretensioned by means of the central tension rod 6. In this manner compensation is provided for the pretension as well as centrifugal forces and gravity forces, so that the final result is operation without irrelevant forces.

Alternatively, according to FIG. 4 operation may also be carried out using planarity-measuring rollers mounted to the roller 1 using screws 7. These fastening screws 7 may, for example, pass through annular force transducers 4.

The design illustrated in FIGS. 3 and 4 concerns the planarity-measuring bars 3a and 3b. However, the reference-measuring bars 5 may be fastened or clamped in an identical or similar manner.

Figure 6:
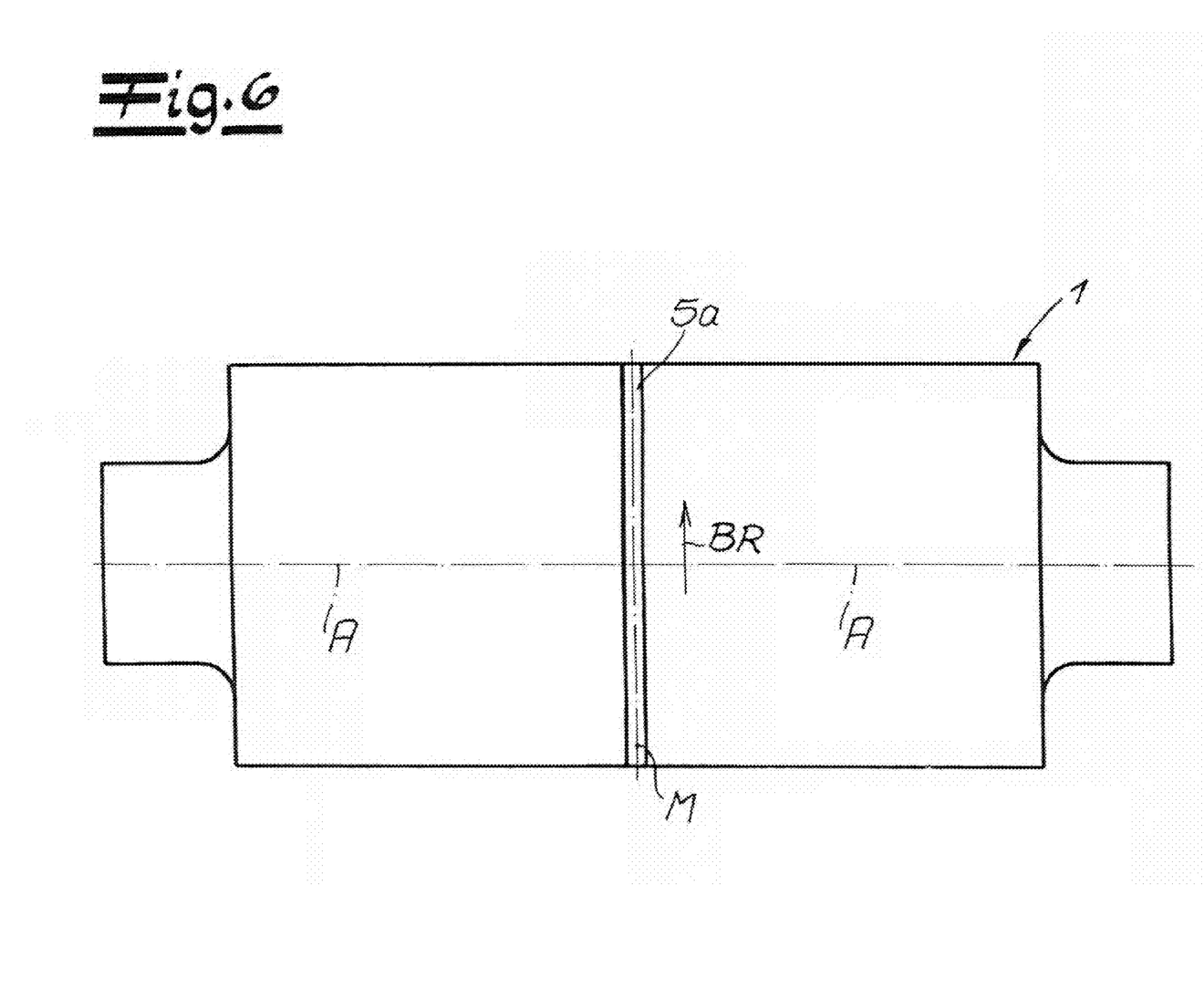
FIG. 6 shows a tension-measuring roller for determining the variation in the strip tension over time.

Whereas FIGS. 1 through 5 show a measurement roller in the embodiment as a planarity-measuring roller together with oblique measuring bars and reference-measuring bars 5, FIG. 6 concerns a measurement roller in the embodiment as a strip tension measurement roller. For this strip tension measurement roller, a measuring bar designed as a strip tension measuring bar 5a is integrated into the roller jacket or the roller surface, this strip tension measuring bar 5a, like the reference-measuring bars 5 according to FIGS. 1 through 5, extending only angularly and consequently not obliquely with respect to the roller axis, but, rather, parallel to the strip feed direction. Planarity-measuring bars extending obliquely with respect to the roller axis are dispensed with in this embodiment, since this measurement roller is intended to be used not as a planarity-measuring roller, but, rather, "only" as a strip tension measurement roller. The strip tension measuring bar 5a is mounted approximately in the center of the roller. By use of such a measurement roller it is then possible to precisely determine fluctuations in strip tension over time. FIG. 6 shows how the strip tension measuring bar 5a runs angularly completely around the roller in the plane M perpendicular to its axis A, thus allowing continuous measurements to be made using the measurement roller. The measuring bar may be designed in the same way as the reference-measuring bars 5 and/or planarity-measuring bars 3a and 3b described in FIGS. 1 through 5. This design is possible when the strip tension measuring bar 5a is composed of a plurality of bar sections, and each bar section in turn is supported on a plurality of force transducers, for example two force transducers situated on the end. Details are not illustrated in FIG. 6.

I claim:

1. In a strip-treating system where a tensioned metal strip moves in a longitudinal direction, an apparatus comprising:
   a roller rotatable about an axis transverse to the direction and having a substantially cylindrical outer surface engaged generally tangentially by the strip;
   a radially shiftable tension-measuring bar set in the roller, extending generally only angularly of the axis so as to lie in a plane substantially perpendicular to the axis, and having an outer surface generally flush with the roller surface; and
   sensor means between the bar and the roller for measuring radial deflection of the bar and thereby determining longitudinal strip tension.

2. The apparatus defined in claim 1 wherein the tension-measuring bar extends angularly all around the roller.

3. The apparatus defined in claim 2 wherein the tensioning-measuring bar is formed by a plurality of bar sections.

4. In a strip-treating system where a tensioned metal strip moves in a longitudinal direction, an apparatus comprising:
   a roller rotatable about an axis transverse to the direction and having a substantially cylindrical outer surface engaged generally tangentially by the strip;
   a radially shiftable tension-measuring bar set in the roller, extending generally only angularly of the axis so as to lie in a plane substantially perpendicular to the axis, and having an outer surface generally flush with the roller surface; and
   sensor means between the bar and the roller for measuring radial deflection of the bar;
   a planarity-measuring bar also set in the roller, extending at an acute angle to and across a respective plane perpendicular to the axis, and having an outer surface generally flush with the roller outer surface; and
   sensor means between the planarity-measuring bar and the roller for measuring radial deflection of the planarity-measuring bar.

5. The apparatus defined in claim 4 wherein both the bars extend essentially over the same angular extent.

6. The apparatus defined in claim 4 wherein the tension-measuring bar is positioned generally centrally in the roller.

7. The apparatus defined in claim 4, further comprising control means connected to both of the sensors for comparing an output of the tension-measuring sensor from the output of the planarity-measuring sensor.

8. The apparatus defined in claim 7 wherein the control means subtracts the tension output form the planarity output.

9. A method of detecting planarity errors in a metal strip passing in a direction over a planarity-detecting roller rotatable about an axis transverse to the direction and having
   a substantially cylindrical outer surface engaged generally tangentially by the strip,
   a radially shiftable tension-measuring bar set in the roller, extending generally only angularly of the axis so as to lie in a plane substantially perpendicular to the axis, and having an outer surface generally flush with the roller surface, and
   a planarity-measuring bar also set in the roller, extending at an acute angle to and across a respective plane perpendicular to the axis, and having an outer surface generally flush with the roller outer surface, the method comprising the steps of:
   sensing radial inward deflection of the tension-measuring bar and generating an output corresponding thereto;
   sensing radial inward deflection of the planarity-measuring bar and generating an output corresponding thereto;
   comparing the outputs over time and thereby detecting defects in planarity over the strip.

10. The method defined in claim 9 wherein the outputs are compared by subtracting the output from the tension-detecting bar from the output of the planarity-detection bar.

* * * * *